United States Patent [19]

Halmi

[11] Patent Number: 4,516,434

[45] Date of Patent: May 14, 1985

[54] FLOW METERING DEVICE WITH LOW ENERGY LOSS

[75] Inventor: Dezsoe Halmi, Cranston, R.I.

[73] Assignee: D. Halmi And Associates Inc., Pawtucket, R.I.

[21] Appl. No.: 543,954

[22] Filed: Oct. 20, 1983

[51] Int. Cl.³ .............................................. G01F 1/44
[52] U.S. Cl. ................................................ 73/861.64
[58] Field of Search ........................ 73/861.63, 861.64

[56] References Cited

U.S. PATENT DOCUMENTS

| 3,686,946 | 8/1972 | Halmi | 73/861.64 |
| 3,733,901 | 5/1973 | Halmi | 73/861.64 |
| 4,174,734 | 11/1979 | Bradham | 73/861.63 |

*Primary Examiner*—Herbert Goldstein
*Attorney, Agent, or Firm*—Salter & Michaelson

[57] ABSTRACT

A venturi-type fluid flow metering device is operative with minimum fluid energy losses and is adapted for construction in reduced lengths. The device comprises inlet, converging, throat and downstream diverging sections, and pressure sensing taps are provided which communicate with the inlet and throat sections for sensing static fluid pressures therein. The converging section comprises an inlet cone portion which extends angularly inwardly in a downstream direction relative to the inlet section and a throat cone portion which extends angularly inwardly in a downstream direction from the inlet cone portion to the throat section, the throat cone portion being at a reduced angle with respect to the inlet section compared to the inlet cone portion. The intersections between the inlet cone portion and the throat cone portion and between the throat cone portion and the throat section are of rounded configurations to prevent the formation of vena contractas in the device so that energy losses are minimized.

7 Claims, 3 Drawing Figures

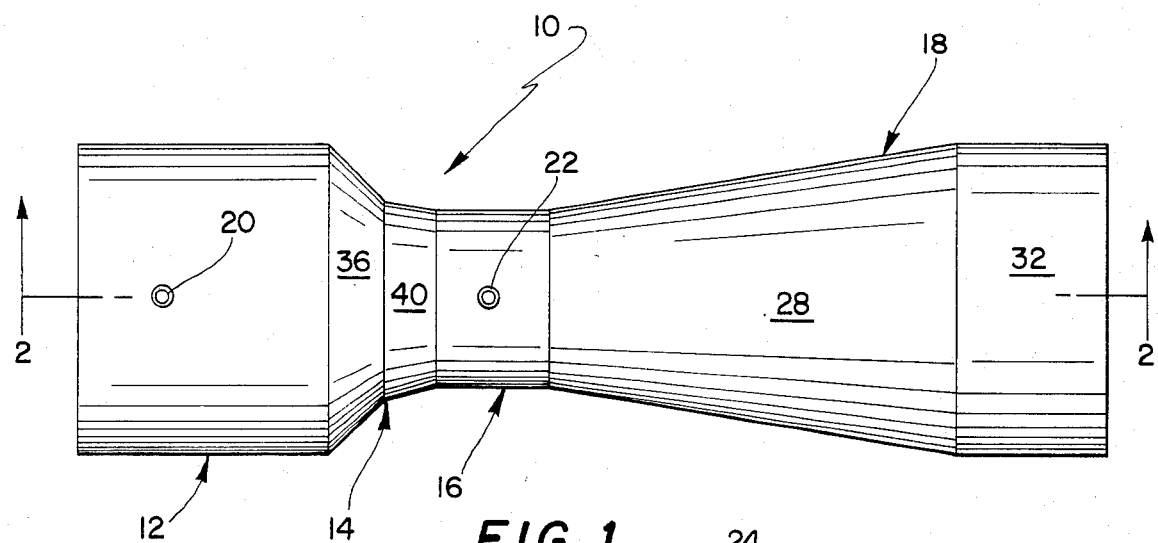
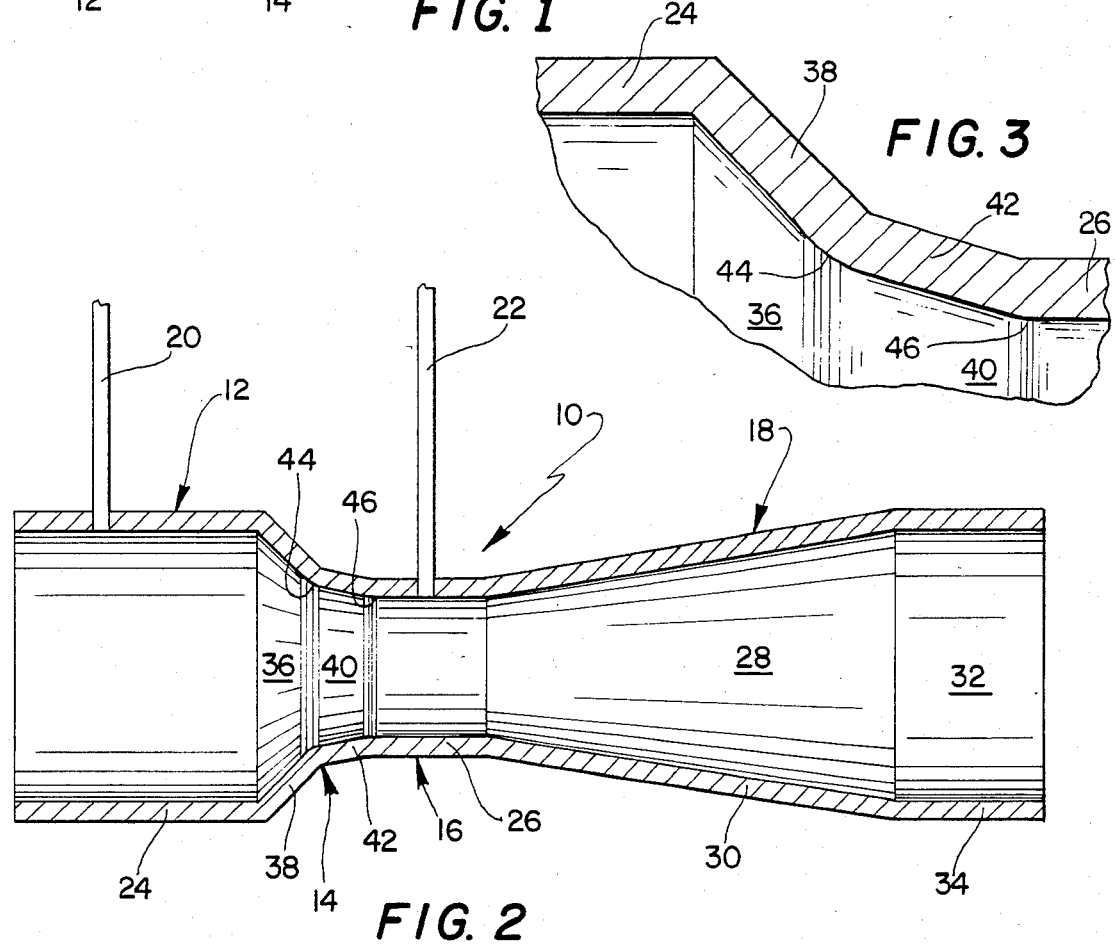

FLOW METERING DEVICE WITH LOW ENERGY LOSS

BACKGROUND AND SUMMARY OF THE INVENTION

The instant invention relates to flow metering devices of the pressure differential producing type and more particularly to a venturi-type flow metering device which is operative with minimum fluid energy losses.

The use of venturi-type flow metering devices is extremely well known, and a wide variety of such devices have heretofore been available. The classic venturi tube is exemplary of one such device and comprises an elongated tubular member having a substantially straight inlet section, an elongated converging section of gradually reducing cross section, a substantially straight throat section, an elongated downstream diverging section of gradually increasing cross section and inlet and throat pressure sensing taps for sensing the static pressures in the inlet and throat sections, respectively. By applying the differential pressure between the inlet and throat taps in a flow equation, the rate of flow of a fluid through the device can be determined. Classical venturi tubes of this type have proven to be effective for metering the flow rates of both liquids and gases. Further, classical venturi tubes can be effectively used for metering the flow rates of fluids containing suspended or entrained solids since they do not easily become fouled and, in fact, exhibit somewhat of a self-scouring effect. However, while classical venturi tubes have proven to be effective for metering fluid flow rates, they have been characterized by relatively long laying lengths, and, therefore, they have generally been relatively expensive to manufacture compared to other known flow metering devices.

In addition to the classical venturi tube, a device known as the venturi nozzle is also widely used in flow metering applications. A venturi nozzle has a substantially straight inlet section, an elliptical converging section of reduced length, and a substantially straight throat section. A venturi nozzle can be constructed with a substantially shorter laying length than a comparable classical venturi tube. However, in a venturi nozzle, the inlet end of the converging section extends substantially perpendicularly inwardly from the inlet section and then extends arcuately in a downstream direction. The inlet end of the converging section of a venturi nozzle therefore acts somewhat like a dam which tends to trap solids which are suspended or entrained in a fluid passing therethrough. Hence, the venturi nozzle does not have the self-scouring effect found with classical venturi tubes.

Another flow metering device of the differential producing type is commonly known as the universal venturi tube and is disclosed in the U.S. patent to Halmi No. 3,686,946. The universal venturi tube comprises a substantially straight inlet section, an inlet cone which extends inwardly in converging relation from the inlet section, a throat cone which extends in converging relation from the inlet cone at a reduced angle relative to the inlet section, and a substantially straight throat section. Pressure sensing taps are also provided in the inlet and throat sections of a universal venturi tube for sensing the static pressures in these areas. The intersections between the inlet and throat cones and between the throat cone and the throat section are preferably both of substantially sharp configurations so that preferably at least two vena contractas are formed in a fluid passing through the device. The universal venturi tube has a self-scouring effect similar to the classical venturi tube, it can be constructed with a reduced laying length, and it is operative for providing accurate flow measurements. However, the energy losses in a fluid passing through the converging section of a universal venturi tube are substantially greater than the energy losses in fluids passing through the converging sections of comparable venturi tubes or venturi nozzles.

The instant invention provides a novel flow metering device of the venturi type which has advantages over all of the above-mentioned devices. The device of the instant invention can be constructed in a reduced laying length, it has a self-scouring effect, it has minimal energy losses, it provides accurate flow measurements, and it can be constructed with reduced manufacturing costs. The device of the instant invention comprises a shaped tubular member comprising a substantially longitudinally extending inlet section, a converging section which extends in converging relation from the inlet section, a substantially longitudinally extending throat section, and preferably also a downstream diverging section. The converging section comprises an inlet cone portion which extends angularly inwardly relative to the inlet section and a throat cone portion which extends angularly inwardly from the inlet cone portion to the throat section, the inlet cone portion, however, being at a reduced angle relative to the inlet section. An important feature in the device of the instant invention which distinguishes it from the devices of the prior art, in particular the universal venturi tube, is the provision of rounded intersections between the inlet cone and throat cone portions and between the throat cone portion and the throat section. These rounded intersections are provided to prevent the formation of vena contractas in a fluid passing through the device so that energy losses in the fluid are minimized. As a result of the rounded intersections in these areas, the energy losses experienced in the device of the instant invention are substantially less than those realized with the universal venturi tube. The device of the instant invention has a self-scouring effect similar to that found in a universal venturi tube, it can be constructed in a reduced laying length, and it is operative for providing accurate flow measurements. The device of the instant invention can be manufactured economically because of its reduced laying length, and further reductions in manufacturing costs can be realized as a result of the rounded intersections hereinabove described, rounded intersections being substantially easier to form in machining operations than the sharp intersections provided in the known devices of this kind. Accordingly, the device of the instant invention is economical to manufacture, and it is operative with minimum energy losses.

Other flow metering devices of the pressure differential producing type which represent additional prior art with respect to the instant invention of which the applicant is aware are disclosed in the U.S. Pat. Nos. to Schroder 2,863,318; Terrell 2,868,012; Shaffer 2,872,810; O'Keeffe 3,013,432; Halmi 3,733,902; Halmi 3,733,901; Bradham 4,174,734; and the British patent to Nathan 473,562. While these references teach a variety of flow metering devices, they do not teach the specific novel features of the instant invention hereinabove set forth, and hence they are believed to be of nothing more than general interest.

Accordingly, it is a primary object of the instant invention to provide an effective flow metering devices of the pressure differential producing type which is operative with minimum energy losses.

Another object of the instant invention is to provide a flow metering device which is operative with reduced energy losses and which has a self-scouring effect.

A still further object of the instant invention is to provide a flow metering device which is operative with reduced energy losses and which can be manufactured relatively inexpensively.

An even further object of the instant invention is to provide a flow metering device having inlet, converging and throat sections wherein the converging section comprises an inlet cone portion which extends angularly inwardly relative to the inlet section and a throat cone portion which extends angularly inwardly from the inlet cone portion to the throat section at a reduced angle relative to the inlet portion, and wherein the intersections between the inlet cone portion and the throat cone portion and between the throat cone portion and the throat section are of rounded configurations to prevent the formation of vena contractas in the device.

Other objects, features and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention:

FIG. 1 is a top plan view of the device of the instant invention; and

FIG. 2 is a side sectional view taken along line 2—2 in FIG. 1.

FIG. 3 is an enlarged sectional view illustrating the rounded intersections between the inlet cone and throat cone portions and between the throat cone portion and the throat section.

DESCRIPTION OF THE INVENTION

Referring now to the drawing, the flow metering device of the instant invention is illustrated in FIGS. 1 and 2 and generally indicated at 10. The device 10 comprises a shaped tubular member having an inlet section generally indicated at 12, a converging section generally indicated at 14 which extends in a downstream direction from the inlet section 12, a throat section generally indicated at 16 which extends in a downstream direction from the converging section 14, and preferably also a downstream diverging section 18 which extends in a downstream direction from the throat section 16. Pressure sensing taps 20 and 22 are provided in the inlet and throat sections 12 and 16, respectively, for sensing the fluid pressures therein, respectively, in order to meter the flow rate of a fluid passing through the device 10. More specifically, in operation of the device for metering the flow rate of a fluid, the differential pressure between the taps 20 and 22 is applied in a conventional venturi-type flow equation in a manner commonly used with other venturi-type flow metering devices. However, because of the specific configuration of the device 10, in particular the configuration of the converging section 14, the device 10 is operative for metering fluid flow rates with minimum flow pressure energy losses. In addition, because of the configuration of the converging section 14, the device 10 is operative with a self-scouring effect which prevents sludge build-up when the device 10 is utilized in applications wherein the fluid passing therethrough contains entrained or suspended solids.

The inlet section 12, the throat section 16, and the downstream diverging section 18 are generally of conventional configurations and similar to corresponding sections found in the known flow metering devices, such as the device disclosed in the U.S. patent to Halmi No. 3,686,946. The inlet section 12 extends generally longitudinally in the device 10, being defined by a substantially straight, substantially longitudinally extending wall 24. The throat section 16 also extends substantially longitudinally in the device 10 but has a reduced cross-sectional dimension relative to the inlet section 12, preferably in the range of one half of the sectional dimension of the inlet section 12, and is defined by a substantially straight, substantially longitudinally extending tubular wall 26 through which the tap 22 extends. The downstream diverging section 18 includes a diverging portion 28 which is defined by a conical wall 30 and which has a sectional dimension which increases gradually in a downstream direction. Also included in the downstream diverging section 18 is an end portion 32 which extends substantially longitudinally in a downstream direction from the diverging portion 28, the end portion 32 being defined by a tubular wall 34 which preferably has a sectional dimension which is approximately the same as that of the inlet section 12. The downstream diverging section 18 is provided for recovering fluid head pressures in a manner generally known in the art.

The converging section 14 extends from the inlet section 12 to the throat section 16 and is constructed in a novel configuration which provides specific advantages over the devices of the prior art. In this regard, the converging section 14 comprises an inlet cone portion 36 which is defined by a conical wall 38 and a throat cone portion 40 which is defined by a conical wall 42. The wall 38 of the inlet cone portion 36 extends angularly inwardly in a downstream direction relative to the wall 24 of the inlet section 12, and the wall 42 of the throat cone portion 40 extends angularly inwardly in a downstream direction from the inlet cone portion 36 to the throat section 16, the wall 42 of the throat cone portion 40, however, being at a reduced angle relative to wall 24 of the inlet section 12 as compared to wall 38 of the inlet cone portion 36. In this regard, preferably the wall 38 extends at an angle of between 30° and 40°, preferably approximately 30°, relative to the wall 24, and preferably the wall 42 extends from the wall 38 at an angle of between 4° and 7° relative to the wall 24. Preferably the throat cone portion 40 extends a distance which is at least approximately one fourth of the diameter of the throat section. It has been found that when the device 10 is constructed in this manner, it can be effectively operated with reduced energy losses, and it can be constructed in a reduced overall length. The intersection between the wall 38 of the inlet cone portion 36 and the wall 42 of the throat cone portion 40 is of rounded configuration, as illustrated at 44, and the intersection between the wall 42 of the throat cone portion 40 and the wall 26 of the throat section 16 is also of rounded configuration, as illustrated at 46. The rounded configurations of the intersections 44 and 46 have particular significance in the device of the instant invention and provide substantial advantages over the devices of the prior art with respect to the minimization of energy losses. Specifically, the rounded intersections 44 and 46 are provided to prevent the formation of vena contractas in fluids passing through the device 10 so that turbulence is minimized to minimize pressure energy losses. In other words, a minimum amount of energy is dissipated from the fluid in the form of heat, and a large percentage of the original fluid head pressure can be recovered in the diverging section 18. Further, it should be pointed out that while the device 10 herein disclosed includes two converging section portions, the construction of the device of the instant invention with additional converging section portions which extend angularly inwardly relative to the wall 24 of the inlet section 12 and which are interconnected with rounded intersections is contemplated.

In operation of the device 10, the flow rate of a fluid is metered by measuring the static pressures in the inlet and throat sections 12 and 16, respectively, with the taps 20 and 22, respectively. The pressures sensed by the taps 20 and 22 are compared, and the pressure differential between the taps 20 and 22 is applied in a flow equation to determine the flow rate of the fluid passing through the device 10. Specifically, the pressure differential is applied in a conventional venturi-type flow equation as set forth below.

$$Q = \frac{AC}{\sqrt{1-B^4}} \sqrt{2g\Delta H}$$

Q = Flow rate in cubic feet per second.
A = Cross-sectional area of throat section in square feet.
C = Discharge coefficient, i.e., ratio of actual flow to theoretical flow.
B = ratio of diameter in throat section to diameter in inlet section.
g = gravitational acceleration.
$\Delta H$ = Differential pressure between inlet and throat taps expressed in feet of line fluid at line conditions.

In the above flow equation, the discharge coefficient C represents an empirically determined value which relates the actual flow rate through the device 10 determined by a flow calibration (a physical measurement the fluid flow under test conditions) to the theoretical flow rate through an ideal venturi-type device. The discharge coefficient for each particular metering device is related to the efficiency with which the device operates, and hence the discharge coefficient is also related to the amount of energy which is lost from the fluid as it is accelerated. Accordingly, an ideal device having no energy loss would have a discharge coefficient of 1; but in actual practice all discharge coefficients are somewhat less than 1. The following table indicates typical discharge coefficients for various flow metering devices, including the device of the instant invention:

| Metering Device | Typical Discharge Coefficient |
| --- | --- |
| Classical venturi tube | .984 |
| Venturi nozzle | .985 |
| Universal venturi tube | .980 |
| Device 10 | .985 |

It is seen from the above table that the device of the instant invention typically has a discharge coefficient which is substantially greater than that of a comparable universal venturi tube, approximately the same as that of a comparable classical venturi tube, or a comparable venturi nozzle. Accordingly, by comparing the above discharge coefficients, it is seen that the device of the instant invention operates with substantially lower converging section energy losses than a universal venturi tube (actually approximately 20% lower converging section losses), approximately the same converging section energy losses as a classical venturi tube and a venturi nozzle. In contrast to a venturi nozzle, however, the device 10 is operative with a self-scouring effect so that entrained solids are not normally deposited in the device 10. Further, in contrast to a classical venturi tube, the device 10 can be constructed with reduced laying lengths to minimize manufacturing costs.

Hence it is seen that the device of the instant invention has specific advantages over a number of the heretofore available flow metering devices. It operates with reduced energy losses and has a self-scouring effect so that it can be utilized to measure the flow of fluids carrying entrained or suspended solids. It can also be constructed in reduced lengths, and it is therefore economical to manufacture. Accordingly, for these reasons, as well as the other reasons hereinabove set forth, it is seen that the device of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A flow metering device of the type operative for producing a pressure differential comprising a shaped tubular member comprising substantially longitudinally extending inlet and throat sections having inlet and throat pressure sensing taps therein, respectively, and a converging section which interconnects said inlet and throat sections, said converging section comprising an inlet cone portion which extends angularly inwardly in a downstream direction relative to said inlet section and a throat cone portion which extends angularly inwardly in a downstream direction from said inlet cone portion to said throat section, said throat cone portion being at a reduced angle with respect to said inlet section in comparison to said inlet cone portion, the intersections between said inlet cone portion and said throat cone portion and between said throat cone portion and said throat section being of rounded configurations to prevent the formation of vena contractas in fluids passing through said device.

2. In the device of claim 1, the walls of said inlet cone portion being at an angle of between approximately 30° and 40° relative to said inlet section.

3. In the device of claim 1, the walls of said throat cone portion being at an angle of between approximately 4° and 7° relative to said inlet section.

4. In the device of claim 1, the walls of said inlet cone portion being at an angle of approximately 30° relative to said inlet section.

5. In the device of claim 3, the walls of said inlet cone portion being at an angle of approximately 30° relative to said throat section.

6. In the device of claim 1, said throat cone portion extending a distance which is at least approximately one fourth of the diameter of said throat section.

7. In the device of claim 5, said throat cone portion extending a distance which is at least approximately one fourth of the diameter of said throat section.

* * * * *